(No Model.) 2 Sheets—Sheet 1.
C. E. ROBERTS.
MACHINE FOR SHEARING METAL BARS.
No. 358,884. Patented Mar. 8, 1887.
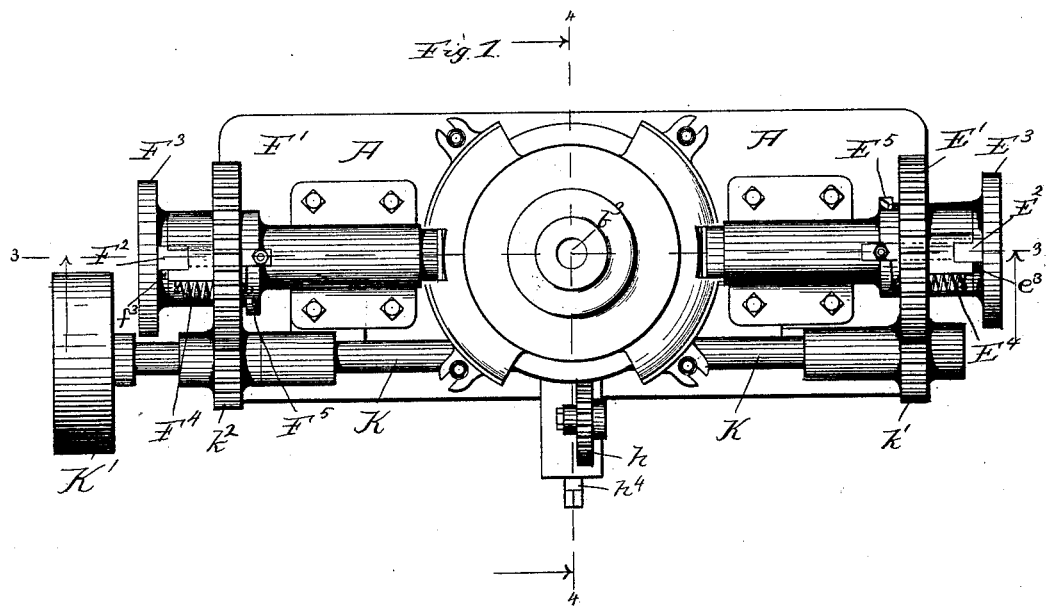
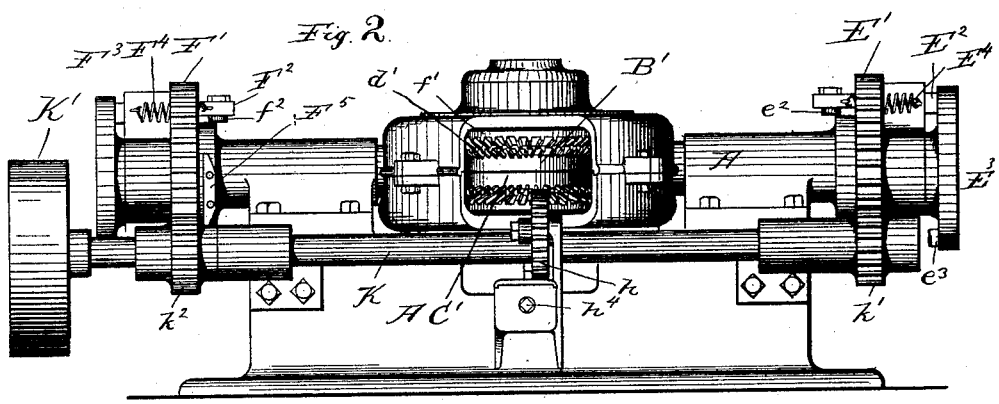
Witnesses:
Lew. E. Curtis.
H. M. Munday.
Inventor:
Charles E. Roberts.
By Munday Evarts & Adcock
his Attorneys.
N. PETERS, Photo-Lithographer, Washington, D. C.

(No Model.) 2 Sheets—Sheet 2.
C. E. ROBERTS.
MACHINE FOR SHEARING METAL BARS.
No. 358,884. Patented Mar. 8, 1887.
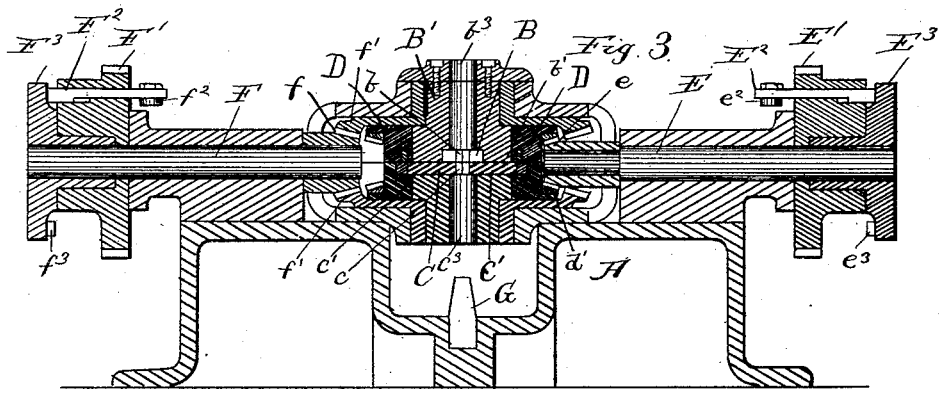
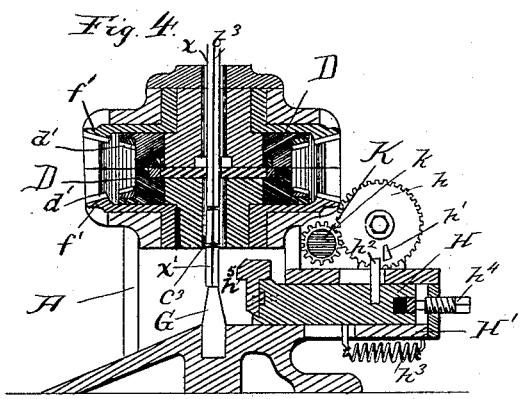
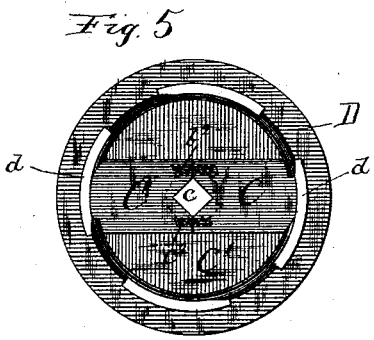
Witnesses:
Geo. E. Curtis.
H. M. Munday,
Inventor:
Charles E. Roberts.
By Munday Evarts & Adcock
his Attorneys.

UNITED STATES PATENT OFFICE.

CHARLES E. ROBERTS, OF CHICAGO, ILLINOIS.

MACHINE FOR SHEARING METAL BARS.

SPECIFICATION forming part of Letters Patent No. 358,884, dated March 8, 1887.

Application filed November 15, 1886. Serial No. 218,888. (No model.)

*To all whom it may concern:*

Be it known that I, CHARLES E. ROBERTS, a citizen of the United States, residing at Chicago, in the county of Cook and State of Illinois, have invented a new and useful Improvement in Machines for Cutting Metal Bars, of which the following is a specification.

Heretofore metal bars or rods have generally been cut into lengths by means of a chisel or a pair of shears, or else by means of a turning tool or saw, the saw or tool being revolved, or else the bar itself revolves in a chuck. By the shear or chisel method bars may be cut rapidly; but the shears tend to flatten, upset, or press the bar out of shape at its severed ends, especially where the bar is of any considerable size—as, for example, an inch or one-half inch square—and they also do not produce a true square-cut end. In cutting bars into lengths for making screws or screw-bolts, it is essential to preserve and not to disturb the true outline or shape of the bar which forms the head of the screw or bolt, and also to make a perfectly true and square cut, so that the top of the bolt-head will be flat and true. This chisel or shearing cut method is not therefore practically applicable where it is desired to preserve the true shape of the bar at its severed ends, and in such cases the bars have usually been cut by a revolving tool or by a tool on a lathe, the bar itself being revolved. This latter method, while it produces a true square cut and does not alter the shape of the bar, is comparatively slow and requires an expensive machine or lathe. Heretofore, also, bars have been severed by rotary shears having axial dies, through which the bar to be severed is inserted—such, for example, as those shown and described in the patent to Snell and Tucker, No. 82,886, of October 6, 1868, or in patent to Stevens, No. 146,846, of January 27, 1874; but such machines have had no means for automatically closing the parts of the dies together upon the bar, or of automatically feeding the bar forward at intervals, so as to sever the bars rapidly without upsetting or injuring their cut ends, as is required in machines for cutting bars for metal bolts, screws, &c.

It is the object of my invention to provide a simple and efficient machine or means for rapidly severing the bars or rods into lengths without altering or injuring their shape at their severed ends.

In my invention a pair of rotary two-part opening and closing dies are employed, each having an opening corresponding to the shape of the bar to be severed, which is inserted through the die-openings. The disks or dies fit flat or close together. The two parts of each die open automatically to allow the bar to be fed through them at intervals as the lengths are severed from it, and are automatically closed together upon the bar by means of a cam or other suitable mechanism, so as to firmly embrace or inclose the bar and prevent its being upset or injured in shape at its severed ends. By turning or rotating the dies in opposite directions, with the bar thus firmly clamped between the two parts of each die, the bar will be severed by a smooth square cut without upsetting, injuring, or in any way altering the shape of the bar at its severed ends. The revolving dies or plates may be turned or rotated to any desired extent. I find, however, that about one-eighth of a turn for each one is sufficient to sever the bar where they are both rotated in opposite directions. I deem it preferable to rotate both the dies or plates. One of them, however, may be stationary, in which case the rotary one should be given about twice the extent of rotation as where they are both oppositely rotated—that is to say, where only one die or plate is rotated, one-fourth of a turn thereof will be but the equivalent of one-eighth of a turn of each die or plate where both are rotated in opposite directions. It will of course be observed, also, that both dies or plates may be rotated in the same direction, provided that one is rotated faster than the other. The preferable way, however, of practicing my invention is to rotate both dies or plates and in opposite directions.

My invention also consists in a pair of such dies, each of which is made in two or more parts, and adapted to open and close upon the rod or bar to allow the same to feed or be fed through the dies as the pieces are severed from its end.

It also consists, in connection with such opening and closing dies, of means or mechanism to open and close such dies and hold the same closed upon the rod while the dies are, or one of them is, rotated.

It also consists, in connection with such dies, of a device for feeding the rod or bar through the same in measured lengths at intervals.

In practicing the invention I find it advisable, for convenience in feeding the rod through the dies, to give the dies not quite enough rotary movement to completely sever the piece from the bar, but to leave the severed piece attached to the bar by a slender filament at the center of the bar, so the bar, with the severed pieces thereon, may project through the die or disk and rest against a feed-stop which regulates the amount of feed; and the invention also consists, in connection with such dies, of a reciprocating or otherwise movable punch or device for knocking or breaking off the severed piece from the end of the bar, and thus allowing the rod to feed forward against the feed-stop.

The invention also consists in the novel devices and novel combination of devices herein shown and described, and more particularly pointed out in the claims.

In the accompanying drawings, which form a part of this specification, I have shown what I believe to be the best form of machine now known to me for reducing my invention to practice. It is obvious, however, that the particular form of mechanism for opening and closing the parts of the dies, for rotating one or both of the dies, and for feeding the rod forward at intervals in required lengths may all be greatly varied by the skilled mechanic, or equivalents substituted therefor, without departing from my invention.

In said drawings, in which similar letters of reference indicate like parts, Figure 1 is a plan view of the machine. Fig. 2 is a side elevation; Fig. 3, a vertical section on line 3 3 of Fig. 1; Fig. 4, a vertical section on line 4 4 of Fig. 1, and Fig. 5 a detail plan showing one of the revolving dies and the cams for opening and closing the same.

In said drawings, A represents the frame of the machine, which may be of any suitable construction.

B and C are a pair of dies or plates having die-holders $b$ $c$ therein, conforming in shape to the bar or rod to be cut, and fitting close together or face to face. Each of these dies or plates B C is preferably made in two parts, as shown in Fig. 5, so that they may open and close slightly to permit the feed of the rod or bar through them.

The dies B B and C C are mounted in radial slots or grooves $b'$ $c'$ in the rotary disks or wheels B' C', so that they may slide radially in and out thereon to open and close upon the rod. The two parts of each of the dies are opened or separated by means of springs $b^2$ $c^2$, and they are closed and held closed while the bar is being severed by means of cam-projections $d$ on the rings D D, surrounding the disks B' C', which cam-projections fit against the ends of the radially-sliding die-plates B B C C. The rings D D are rotated to close or open the dies by a bevel-gear, $e$, on a shaft, E, which meshes with bevel-gears $d'$ $d'$, cut on the outer rims of the rings D D. The cam-projections $d$ $d$ on the rings D D preferably consist of separate or detachable segments secured in suitable recesses in the rings D D.

The disks B' C' are rotated in opposite directions to sever the rod clamped in the dies B B C C by means of a bevel-gear, $f$, on the shaft F, which meshes with bevel-gears $f'$ $f'$, keyed rigidly to the hubs of the disks or wheels B' C'. The axial openings $b^3$ $c^3$ in the disks or wheels B' C', through which the rod or bar $x$ is fed, should be made large enough to accommodate rods of different sizes, so that by simply changing the die-plates B C rods of different sizes may be cut on the same machine.

The dies B C are preferably arranged to rotate in a horizontal plane, so that the rod may be fed vertically through them, and its own gravity utilized as a means for moving it forward.

G is a feed-stop, against which the end of the rod or of the undetached cut piece $x'$ thereon rests. The feed-stop G may be adjusted up and down on the frame A, to adapt the machine to cut pieces from the bar of any desired length. The feed-stop G fits in a socket or hole in the frame, and its adjustment may be effected in any suitable manner—as, for example, by plates or washers in the bottom of such socket; or stop-pins or blocks G may be used of different lengths, or the stop G may be provided with screw-threads and fit in a threaded hole in the frame A.

I have not thought it necessary to indicate in the drawings any special means of adjusting the feed-stop, as it is a simple matter, and a variety of ways will naturally suggest themselves to the skilled mechanic.

H is a reciprocating slide or knocker for breaking or detaching the cut piece $x'$ from the rod. It is reciprocated back and forth in suitable guides, H', on the frame of the machine by means of a revolving wheel, $h$, having a projection, $h'$, which engages a pin, $h^2$, on the slide H. The slide H is retracted by means of a spring, $h^3$. An adjustable stop or screw, $h^4$, limits its backward movement. The slide H is provided with a face-block, $h^5$. The wheel or spur-gear $h$ is driven by a spur-gear, $k$, on the driving-shaft K.

K' is the driving-pulley.

The shaft E is driven from the driving-shaft K by means of the spur-gear $k'$ thereon, which meshes with a gear, E', loosely journaled on the shaft E. The gear E' has a sliding clutch-pin, E², which engages corresponding lugs, $e^3$, on the clutch-disk E³, secured to the shaft E. The clutch-pin E² is reciprocated to engage or disengage the lugs on the clutch-disk E³ by means of a spring, E⁴, and a stationary cam, E⁵, on the frame of the machine. The clutch-pin E² is provided with a friction-roller, $e^2$.

The shaft F, by which the disks B' C' are rotated in opposite directions, is driven in a similar way from the driving-shaft K by means of a spur-gear, $k^2$, thereon, which meshes with a loose gear, F', on the shaft F, a clutch-pin, $F^2$, clutch-disk $F^3$, lugs $f^3$, spring $F^4$, cam $F^5$, and friction-rollers $f^2$. Each of the clutch-disks $E^3 F^3$ are provided with two lugs, $e^3 e^3 f^3 f^3$, which engage the clutch-pins $E^2 F^2$, and the cams $E^5 F^5$, which disengage the clutch-pins from the clutch-disks, are located diametrically opposite each other, so that the shafts E and F will not both be revolved at the same time.

In operation, a bar being inserted through the die-plates B C and disks B' C' and the machine set in motion, the clutch-pin $E^2$ on the clutch-wheel E' engages one of the lugs $e^3$ on the clutch-disk $E^3$, and thus rotates the shaft E one-half of a revolution, thus turning the cam-rings D D each one-eighth of a revolution, and thereby closing the dies B B C C radially together upon the rod or bar. As soon as this is done, the cam $E^5$, engaging the clutch-pin $E^2$, withdraws the same and holds it withdrawn until the lug $e^3$ with which the pin was engaged passes the same, thus allowing the gear E' to revolve loosely on the shaft E. The moment the gear E' is thus disengaged from the shaft E one of the lugs $f^3$ on the clutch-disk $F^3$ comes in contact with the clutch-pin $F^2$ on the gear F', and thus causes the shaft F to turn one-half of a revolution, and thereby rotate the die-holding disks B' C' each about one-eighth of a revolution in opposite directions, thus severing the bar. When this is done, the cam $F^5$ withdraws the clutch-pin $F^2$, thus allowing the gear F' to revolve loosely, and immediately thereafter the other lug $e^3$ on the wheel $E^3$ engages the clutch-pin $E^2$ and turns the shaft E, thus causing the cam-rings D D to rotate, so that the springs $b^2 c^2$ may separate or open the dies B B C C. The punch H moves forward and breaks a severed piece, $x'$, from the bar $x$, and then as soon as the spring withdraws the slide H the bar $x$ feeds forward against the feed-stop G, and the operation is repeated again and again. By gearing the machine so that the disks B' C' will be given a somewhat greater turn the dies will completely sever the piece from the bar; but I prefer not to entirely sever the piece by the rotation of the dies, and to leave the piece attached by a central filament, which may be easily broken by the slide H, so that the sidewise removal of the severed piece $x'$ will operate to allow the bar to feed against the fixed stop G. The stop G thus makes a simple and very accurate means of feeding the bar in definite lengths. If the piece $x'$ were completely severed from the bar by the rotation of the dies and the stop G employed as a feed-stop, it would be necessary either to employ a guiding-tube for the severed pieces to keep them end to end if they were punched out or removed sidewise by a slide, as H, or else to make the stop G movable, to permit the lengthwise removal of the severed piece from the hole in the die C and disk C'. It thus somewhat simplifies the machine to so gear it that the rotation of the dies is not quite sufficient to completely sever the bar. If desired, however, the dies may be geared to completely sever the bar, and any well-known intermittent feed mechanism may be employed to feed the bar forward.

The cutting faces or edges of the dies are simply the margins of the holes in the die-plate through which the bar or rod is inserted. It is much better to make each of the dies in two or more parts, so that they may close upon and thus snugly and tightly fit the bar above and below the point where it is to be severed.

Certain features of my invention are obviously independent of the particular kind of dies employed, or whether they be made in two parts or not, and so far as such features of my invention are concerned each die may be made of a single plate, and consist simply of a plate with a hole in it conforming to the cross-section of the bar to be severed. In such case it will of course be understood that the hole or opening in the die-plate must be enough larger than the bar to allow the bar to be fed through it. It is also preferable that each of the dies should embrace the bar upon all sides in order to better keep it to its true shape; but some of the advantages of my invention may be had if the dies do not embrace the bar upon all sides—as, for example, if the dies only embrace the bar on two opposite sides.

It will of course be understood that the dies or plates need not be given a complete rotation, but may be rotated or oscillated part of a turn to sever the bar, and then part of a turn in the opposite direction to bring the die-holes into register with each other. It is more convenient to rotate the die continuously in the same direction, as herein shown and described; but by use of the term "rotate" I do not confine myself to a die that rotates a complete turn or that rotates always in the same direction.

I claim—

1. The bar-cutting device consisting in the combination of an opening and closing two-part die, a corresponding opening and closing two-part rotary die, through both of which the rod or bar to be severed is inserted, and means for automatically closing the parts of each of such dies upon the rod or bar, substantially as specified.

2. The bar-cutting device consisting in a pair of oppositely-rotating two-part opening and closing dies, B B and C C, and means for automatically opening and closing and holding closed the parts of such dies, substantially as specified.

3. The combination, with oppositely rotary disks or wheels B' C', of dies B B and C C, and cam-rings D D, for closing the parts of said dies, substantially as specified.

4. The combination, with the oppositely rotary disks or wheels B' C', of dies B B C C and cam-rings D D, for closing the parts of said dies, and springs for separating the parts of said dies, substantially as specified.

5. The combination, with the oppositely rotary disks or wheels B' C', of dies B B and C C, cam-rings D D, for closing the parts of said dies, and a feed stop, G, substantially as specified.

6. The combination, with the oppositely rotary disks or wheels B' C', of dies B B and C C, cam-rings D D, for closing the parts of said dies, a feed-stop, G, and a breaker device, H, substantially as specified.

7. The combination, with the oppositely rotary disks or wheels B' C', of the dies B B and C C, cam-rings D D, for closing the parts of said dies, and a reciprocating punch or slide, H, substantially as specified.

8. The combination, with the oppositely rotary disks or wheels B' C', of dies B B and C C, cam-rings D D, for closing the parts of said dies, said disks B' C' being furnished with bevel-gears, a driving-shaft, F, and bevel-gear $f$, engaging said bevel-gears on said disks B' C', substantially as specified.

9. The combination, with the oppositely rotary disks or wheels B' C', of dies B B and C C, cam-rings D D, for closing the parts of said dies, said disks B' C' being furnished with bevel-gears, a driving-shaft, F, and bevel-gear $f$, engaging said bevel-gears on said disks B' C', said rings D D having bevel-gears, and a shaft, E, having a bevel-gear, substantially as specified.

10. The combination, with the oppositely rotary die-carrying wheels or disks B' C', furnished with bevel-gears, of shaft F, having bevel-gear $f$, substantially as specified.

11. The combination, with dies B B C C, of disks B' C', cam-rings D D, having bevel-gears, and shaft E, having bevel-gear $e$, substantially as specified.

12. The combination of dies B B C C, die-disks B' C', cam-rings D D, a shaft, F, for driving said disks B' C', shaft E, for driving said rings D D, and a clutching device for each of the shafts E F, to engage one of said shafts at a time, substantially as specified.

13. The combination of dies B B C C with disks or wheels B' C', cam-rings D D, gears $d'$ $d'$ and $f'$ $f'$, shafts E F, gears $e$ $f$, loose gears E' F', clutch-pins $E^2$ $F^2$, clutch-disks $E^3$ $F^3$, lugs $e^3$ $f^3$, and cams $E^5 F^5$, substantially as specified.

14. The combination of the dies B B C C with disks or wheels B' C', cam-rings D D, gears $d$ $d$ and $f'$ $f'$, shafts E F, gears $e f$, loose gears E' F', clutch-pins $E^2$ $F^2$, clutch-disks $E^3$ $F^3$, lugs $e^3$ $f^3$, cams $E^5$ $F^5$, and springs $E^4$ $F^4$, substantially as specified.

15. The combination of dies B B C C with disks B' C', cam-rings D D, a shaft, E, geared with said cam-rings, a shaft, F, geared with said disks, and mechanism for driving said shafts E and F alternately, substantially as specified.

16. The combination of dies B B C C with disks B' C', cam-rings D D, a shaft, E, geared with said cam-rings, a shaft, F, geared with said disks, and mechanism for driving said shafts E and F alternately, and means for feeding the bar forward at intervals, substantially as specified.

17. The combination of dies B B C C with disks B' C', cam-rings D D, a shaft, E, geared with said cam-rings, a shaft, F, geared with disks, and mechanism for driving said shafts E and F alternately, means for feeding the bar forward at intervals, and feed-stops G, substantially as specified.

18. The combination of dies B B C C with disks B' C', cam-rings D D, a shaft, E, geared with said cam-rings, a shaft, F, geared with disks, and mechanism for driving said shafts E and F alternately, feed-stops G, and reciprocating slide H, substantially as specified.

19. The combination of dies B B C C with disks B' C', cam-rings D D, a shaft, E, geared with said cam-rings, a shaft, F, geared with disks, and mechanism for driving said shafts E and F alternately, feed-stops G, reciprocating slide H, having pin $h^2$, and wheel $h$, having lug $h'$, substantially as specified.

20. The combination, with a die or plate having a hole or opening for the bar to be severed, of an adjoining rotary die or plate having a corresponding hole or opening, and a breaker device, as H, substantially as specified.

CHARLES E. ROBERTS.

Witnesses:
EDMUND ADCOCK,
H. M. MUNDAY.